Figure 1:
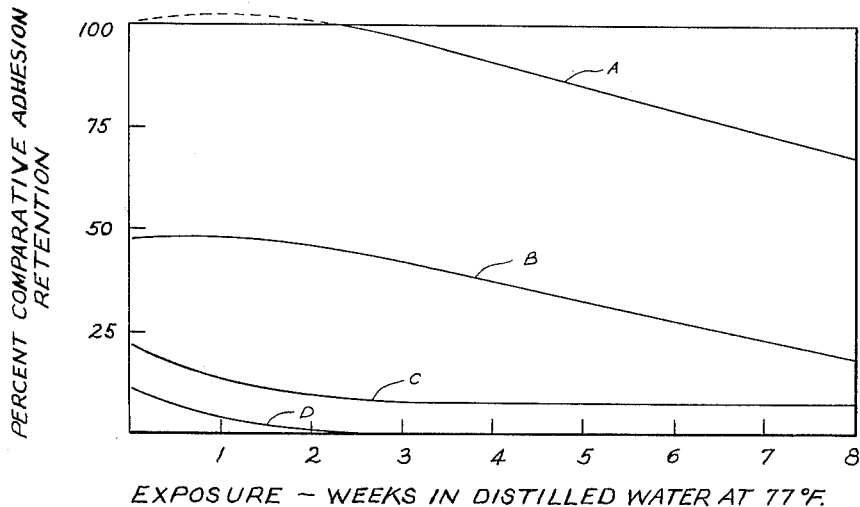

April 19, 1966  G. A. STEIN ETAL  3,246,671
CLAY PIPE JUNCTURES AND METHOD
Filed Nov. 20, 1962

GEORGE A. STEIN
ELLWOOD R. PELTON
INVENTORS.

3,246,671
CLAY PIPE JUNCTURES AND METHOD
George A. Stein, 5826 Oakview Circle, Hopkins, Minn., and Elwood R. Pelton, 6806 Hickory St. SE., Minneapolis, Minn.
Filed Nov. 20, 1962, Ser. No. 239,008
6 Claims. (Cl. 138—109)

This invention relates to an adhesion promotor for use as a primer in conjunction with urethane resins and elastomers, and to a method for its application. More particularly, this invention teaches a method and compound for treating clay products, particularly clay pipes, prior to applying urethane elastomers so as to increase the bond strength and minimize bond strength degradation between the clay product and the urethane compound when exposed to water. This primer is of particular value as a means of increasing the bond strength between clay surfaces and the urethane elastomers.

In recent years, urethane compounds have been developed which are particularly useful as gaskets for forming watertight joints between clay pipe sections. The gaskets are generally formed on the pipe in situ and permanently bonded thereto. With the urethane gasket permanently attached to the pipe, two sections of pipe may be merely squeezed together to form a watertight seal. A less desirable method of utilizing the urethane elastomer gasket is to form the gasket separately and thereafter bond it to the pipe.

The problem in the art is to form a permanent bond between the urethane elastomers and the clay pipe which can withstand prolonged water immersion without degradation.

It is accordingly an object of this invention to provide a method of promoting and increasing the adhesion of urethane elastomers to clay pipe surfaces which are subject to prolonged exposure to water.

It is further an object of this invention to increase the adhesion of urethane to clay materials and in so doing to form a bond which will not readily degrade in actual use.

It is another object of this invention to provide a method of increasing the adhesion between urethane compounds and silica and silicate surfaces by precoating the silica or silicate surfaces with a silicone compound.

A further and particular object of this invention is to show the critical relation as to the thickness of the silicone coating and the increased adhesive properties.

Another and less preferred object of this invention is to provide a primer material in a critical relationship which will increase the adhesion of phenol-formaldehyde resins, melamine formaldehyde resins, and urea formaldehyde resins to bond to foundry sand, or other silica and silicate surfaces.

To accomplish the foregoing and related ends, this invention then comprises the features above and hereinafter set forth, as more fully described and particularly pointed out by the claims, the following description setting forth in detail certain illustrative embodiments of the invention and improvement, these being indicative, however, of but a few of the various ways in which the principle of the invention may be employed.

The drawings are illustrative of the specific and preferred embodiments herein, wherein:

FIGURE 1 is a graph illustrating the improved adhesion-retention of urethane elastomers to clay pipes, as herein provided.

Figure 2:
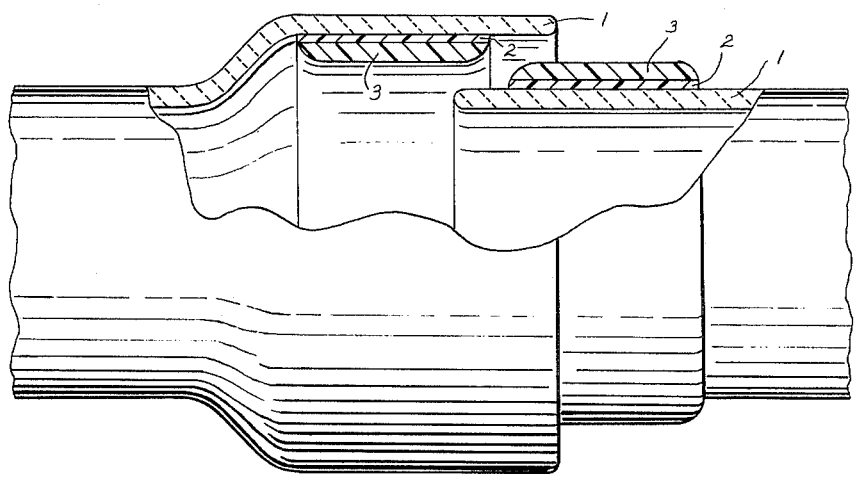

FIGURE 2 shows the manner in which urethane elastomer gaskets are herein applied to clay pipes which are often referred to as tiles. FIGURE 2 illustrates the use of this invention where the primer 2, as herein described, is applied to the tile 1 and allowed to dry. The elastomer 3 is then applied and cured in place, or alternately, the preformed gasket 3 is glued in place using additional urethane elastomer, phenol-formaldehyde resins, melamine formaldehyde resins, and urea formaldehyde resins as the gluing agent. With the elastomer gaskets in place, two sections of pipe will form a watertight seal by merely sliding them together.

The primer of this invention is a water soluble silane compound of the formula

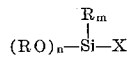

where R is a short chain hydrocarbon containing 1 to about 4 carbon atoms, "$n$" is a positive integer equal to two or three, "$m$" is a positive integer equal to zero or one, and X is a radical of three to about eight carbons and including an active hydrogen containing group. By an active hydrogen containing group we mean those groups which will react with an —N=C=O group. These include radicals containing the function groups —OH, —NH$_2$, —NHR, —SH, and

It is therefore recognized that "X" is a short chain of 3 to about 8 carbons and may be an alcohol, a primary or secondary amine, a polyamine, a mercaptan, or a carboxylic group.

The compounds of this invention include such compounds as hydroxyalkyldialkoxyalkylsilane, hydroxyalkyltrialkoxysilane, aminoalkyldialkoxyalkylsilane, aminoalkyltrialkoxysilane, polyaminoalkyldialkoxyalkylsilane, polyaminotrialkoxysilane, mercaptoalkyldialkoxyalkylsilane, mercaptoalkyltrialkoxysilane, carboxylalkyldialkoxyalkylsilane, and carboxylalkyltrialkoxysilane.

More specifically, this invention includes such compounds as hydroxypropyltrimethoxysilane, hydroxymethyldiethoxymethylsilane, aminobutyltrimethoxysilane, hydroxymethyldiethoxymethylsilane, diaminodipropyltrimethoxysilane, N-(beta-aminoethyl)-gamma-aminopropyltrimethoxysilane, aminobutyldimethoxymethylsilane, carboxypropyltriethoxysilane, mercaptopropyltrimethoxysilane, gamma-aminopropyltriethoxysilane, and the like, and mixtures of the same.

As stated, the compound

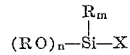

must be water soluble and capable of hydrolyzing at the alkoxy linkages.

The preferred silane compounds are the aminoalkyltrialkoxysilanes. More specifically, N-(beta-aminoethyl)-gamma-aminopropyltrimethoxysilane which has the formula:

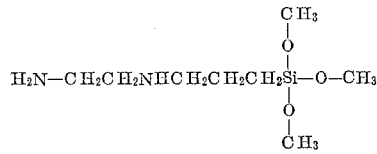

and gamma-aminopropyltriethoxysilane which has the formula:

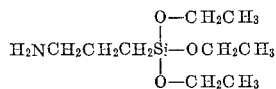

In application, the primer of this invention consists of about 0.20% to about 5.0% of the said silane compounds in an aqueous solution. The preferred amount is about 0.5% of the preferred silane compound. It is also advantageous to include up to about 5% methanol, ethanol, isopropanol or the like water soluble alcohol to serve as a stabilizer and to control the polymerization of the silane.

The primer solution is applied to the clay surface by any conventional means such as dipping, brushing, spraying or the like, and allowed to dry at room temperature or preferably at an elevated temperature up to about 400° F.

The polymer so formed becomes attached to the silica or silicate surface as a high molecular weight high melting point polymeric film. The polymer is made up of repeating

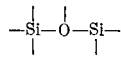

linkages with a pendant side chain on each silicon atom as indicated by the starting structures of the monomeric silanes.

Attachment to the silica or silicate surface is possible by any of the following listed mechanisms:

(1) Hydrogen bonding, or polar attachment, through the active hydrogen groups in the pendant silane side chains.

(2) Hydrogen bonding, or polar attachment, through residual siloxane linkages in the polymer.

(3) Siloxane bonding to form direct Si—O—Si bonds or SiO—Me bonds directly to the silica or silicate surface. ("Me" is used to represent any polyvalent metal element in the surface of a silicate.)

(4) Micromechanical interlocking created by the polymer wetting the rough surface of the substrate.

Our indication is that mechanisms (1) and (2) are most probably prevalent.

We have further discovered that the primer film thickness is of critical importance in obtaining the maximum adhesion between the silica or silicate substrate and the subsequently applied urethane. To obtain the maximum bond it is necessary to provide a film thickness which closely approximates the size of the silane polymer molecule. This will equal a film thickness of from about 10 to about 200 angstrom units with 20 to 50 angstrom units being the preferred thickness.

FIGURE 1 shows the unexpected improvement obtained by pretreating a clay surface with the primer of this invention.

For purposes of testing the adhesion of the urethane elastomer to the clay substrate, one cubic inch clay blocks were used. The surfaces of the clay blocks were treated with various primers including those known and used by the art. After the primer had cured, a ½ inch urethane elastomer material was cast between the primed surfaces of two blocks so as to adhere to both blocks. The elastomer was then cured at room temperature for one hour prior to a further two hour cure at 130° F.

Tensile testing was performed on these test specimens after the specimens had been conditioned at room temperature for 48 hours prior to testing regardless of any previous exposure. Each test group consisting of five test specimens of each primer system selected at random. The tests were conducted using an Instron Universal Testing Machine with a head travel of 0.05 inch per minute.

The following non-limiting examples will better serve to illustrate the manner in which various known primer systems performed in comparison to the primer of this invention.

*Example I*

A silane primer solution was made by mixing 1.0 parts of gamma-aminopropyltriethyoxysilane, 0.5 parts of methanol and 98.5 parts of distilled water. After mixing the primer was ready for immediate use.

*Example II*

A silane primer solution was made of mixing 0.5 parts of N-(beta-aminoethyl) gamma-aminopropyltrimethoxysilane, 0.5 parts of ethanol and 99 parts of distilled water. After thoroughly mixing the primer was ready for use.

*Example III*

Clay blocks were primed by thoroughly wetting the surface with the indicated primer and curing at 130° F. prior to casting a urethane elastomer between the primed surfaces as described above. A control was run using clay blocks without any primer. The following tensile strengths were obtained after 48 hours air exposure at room temperature.

Primer: Tensile strength (p.s.i.)
(A) Urethane coating vehicle _____ 18.7
(B) Epoxy coating vehicle _____ 39.0
(C) Silane solution of Example I _____ 48.7
(D) Silane solution of Example II _____ 76.9
(E) Control (no primer) _____ 4.4

*Example IV*

Clay blocks treated as in Example III were submerged in distilled water at 77° F. for one week. The following tensile strengths were obtained:

Primer: Tensile strength (p.s.i.)
(A) Urethane coating vehicle _____ 6.7
(B) Epoxy coating vehicle _____ 39.0
(C) Silane solution of Example I _____ 41.0
(D) Silane solution of Example II _____ 86.5
(E) Control (no primer) _____ 7.5

*Example V*

After continued submersion in distilled water at 77° F. the following results were obtained for the various exposures:

| Primer | Tensile strength (p.s.i.) | | | |
|---|---|---|---|---|
| | 2 weeks | 4 weeks | 6 weeks | 8 weeks |
| (A) Urethane coating vehicle | 6.8 | 5.5 | 5.6 | 4.0 |
| (B) Epoxy coating vehicle | 37.8 | 32.0 | 19.6 | 15.5 |
| (C) Silane solution of Example I | 29.3 | 30.9 | 18.1 | 21.5 |
| (D) Silane solution of Example II | 82.0 | 73.0 | 63.1 | 55.0 |
| (E) Control (no primer) | 8.3 | (¹) | (¹) | (¹) |

¹ Failed.

*Example VI*

This example illustrates the performance of these several primers under more extreme conditions. The test specimens were placed in boiling distilled water for various time lengths. The following tensile results were obtained for the indicated boiling time.

| Primer | Tensile strength (p.s.i.) | |
|---|---|---|
| | 2 hours | 4 hours |
| (A) Urethane coating vehicle | (¹) | (¹) |
| (B) Epoxy coating vehicle | (¹) | (¹) |
| (C) Silane solution of Example I | 45.9 | 37.4 |
| (D) Silane solution of Example II | 90.6 | 105.3 |
| (E) Control (no primer) | (¹) | (¹) |

¹ Failed.

These tests have shown in the comparative performance of known clay pipe primers for urethane elastomers and the primer of this invention. Referring now to the drawing, FIGURE 1 illustrates the improved adhesion obtained using the primer of this invention. The curve indicated as A of Example II is used as the primer, that obtained when the silane solution, as curve B indicates the results obtained using an epoxy coating composition as the primer. Curve C indicates the results obtained using a urethane coating composition as the primer and curve D is the control, having no primer. The percentage of adhesion is calculated with the initial adhesion of the strongest primer equal to 100%. It will be noted that with the silane primer, this adhesion increases during the first week exposure resulting in readings greater than 100%.

It is thus readily apparent that a primer is necessary to obtain the desirable bonding of the urethane to the clay surface. The novel and unique method and compounds of this invention clearly show their desirability as primers over those previously used.

It will be recognized that the term urethane elastomer or urethane resin, for use with the primer as disclosed herein, is applicable to typical urethane polymers and urethane elastomers of general knowledge and use in the urethane art. The following is given as a typical non-limiting example of urethane elastomer formulation used with the primer for sealing clay tiles. Preferably a two component system is utilized. One component is a prepolymer, the other a "resin"-catalyst-filler mix. They are blended in proportions to give stoichiometric equivalence.

A typical prepolymer is made by reacting an excess of toluene diisocyanate with a polyol. The excess TDI creates a sufficient isocyanate excess for the subsequent elastomer reaction. Isocyanates other than TDI can be used, as is known to the art. A formulation comprises:

(A)

| | Lbs. |
|---|---|
| Triol-MW 700–750 | 40 |
| TDI | 60 |

The "resin" component is normally a blend of hydroxy terminated esters and/or ethers as follows:

(B)

| | Lbs. |
|---|---|
| Polyol MW 1,000 | 25 |
| Polyol MW 2,000 | 25 |
| Polyol MW 3,000 | 25 |
| Polyol MW 4,000 | 25 |
| Clay Filler | 100 |
| Catalysts | 1–3 |

These two materials were blended at the time of use in the ratio of approximately 15 parts of (A) to 85 parts of (B). The resultant elastomer, applied as a coating, as described, or in preformed gasket form, has a Shore A-2 durometer hardness of approximately 70, a tensile strength of approximately 400 p.s.i., and a tensile elongation of approximately 80 percent. Inasmuch as the urethane elastomer is not the subject of this invention and such is known to the art, the details of formulation and application are not essential.

Any castable urethane elastomer produced by reaction of a urethane prepolymer containing free isocyanate groups with a polyhydroxy resinous material normally containing catalyst for the urethane reaction and normally containing a filter material may be used. The polyhydroxy compound can be a glycol polyether, a hydroxy terminated ester, or a mixture of these materials, as known to the art.

It is apparent that many modifications and variations of this invention, or improvement, as hereinbefore set forth may be made without departing from the spirit and scope thereof. The specific embodiments described are given by way of example only and invention, or improvement, is limited only by the terms of the appended claims.

We claim:
1. A clay pipe product comprising:
    (a) a clay pipe; and
    (b) urethane elastomer bonded to a primed surface of said clay pipe; said surface having, as the primer, a thin dried film of a film-forming silane of the formula:

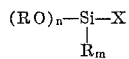

wherein R is an alkyl radical containing 1–4 carbon atoms, wherein $n$ is an integer of from 2–3, wherein $m$ is an integer of from 0–1, and wherein X is a radical of 3–8 carbon atoms which includes an active hydrogen-containing group selected from the group consisting of hydroxyl, primary and secondary amines, carboxyl and mercaptan.

2. The product of claim 1 wherein said silane is aminoalkyl trialkoxysilane.

3. The product of claim 1 wherein said silane is gamma-aminopropyl triethoxysilane.

4. The product of claim 1 wherein said silane is N(beta-aminoethyl) gamma-aminopropyl trimethoxysilane.

5. A method for producing a clay pipe product which comprises:
    (a) coating a surface of a clay pipe with a film-forming aqueous solution containing from 0.2 to 5% silane of the formula:

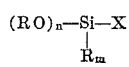

wherein R is an alkyl radical containing 1–4 carbon atoms, wherein $n$ is an integer of from 2–3, wherein $m$ is an integer of from 0–1, and wherein X is a radical containing from 3–8 carbon atoms which includes an active hydrogen-containing group selected from the group consisting of hydroxyl, primary and secondary amines, carboxyl and mercaptan;
    (b) drying said coating to thereby form a thin dried film; and
    (c) then bonding urethane elastomer to the coated surface of said clay pipe.

6. The method of claim 5 wherein said urethane elastomer is bonded to said coated surface with glue selected from the group consisting of urethane elastomers, urethane resins, phenol-formaldehyde resins, melamine formaldehyde resins, and urea formaldehyde resins.

References Cited by the Examiner

UNITED STATES PATENTS

| 2,557,786 | 6/1951 | Johannson | 161—208 X |
| 2,563,288 | 8/1951 | Steinman | 156—329 X |
| 2,622,901 | 12/1952 | Seymour et al. | 156—293 |
| 2,742,378 | 4/1956 | Terotenhuis. | |
| 2,754,237 | 7/1956 | Brooks | 156—329 X |
| 2,885,383 | 5/1959 | Brooks | 260—45.4 |
| 2,924,472 | 2/1960 | Bush | 277—207 |
| 3,030,249 | 4/1962 | Schollenberger et al. | 161—190 |
| 3,054,627 | 9/1962 | Ligon | 277—207 |

FOREIGN PATENTS

| 683,756 | 4/1964 | Canada. |
| 1,249,196 | 11/1960 | France. |

OTHER REFERENCES

"Clay Tile Pipe Primers": Freeman Chemical Corporation, P.O. Box 247, pp. 1–4 dated on each page, Port Washington, Wisconsin.

EARL M. BERGERT, *Primary Examiner.*

C. B. COSBY, *Examiner.*